United States Patent [19]

Tamada

[11] Patent Number: 4,709,282
[45] Date of Patent: Nov. 24, 1987

[54] DEVICE FOR LOADING OR UNLOADING MAGNETIC DISC PACK

[75] Inventor: Kazukiyo Tamada, Tokyo, Japan
[73] Assignee: Fuji Photo Film Co., Ltd., Japan
[21] Appl. No.: 849,277
[22] Filed: Apr. 8, 1986

[30] Foreign Application Priority Data

Apr. 12, 1985 [JP] Japan ................................ 60-078094

[51] Int. Cl.⁴ ........................ G11B 5/012; G11B 17/03
[52] U.S. Cl. ........................................ 360/97; 360/99
[58] Field of Search .................. 360/97, 99, 133, 96.5; 242/199

[56] References Cited

U.S. PATENT DOCUMENTS 4,481,618 11/1984 Nakayama ........................... 360/96.5
4,539,613 9/1985 Suyama et al. ..................... 360/133
4,546,396 10/1985 Schatteman ........................ 360/96.5
4,587,585 5/1986 Shimaoka et al. .................... 360/97

FOREIGN PATENT DOCUMENTS 0137311 4/1985 European Pat. Off. .............. 360/97

Primary Examiner—John H. Wolff
Attorney, Agent, or Firm—Parkhurst & Oliff

[57] ABSTRACT

Device for loading or unloading a magnetic disc pack applicable to a magnetic recorder or reproducer in an electronic camera system wherein a subject is electronically still-photographed and recorded in a rotating magnet sheet, and the reproducing of and image is carried out by a television system or a printer.

This device for loading or unloading a magnetic disc pack is provided therein with a blocking plate for preventing the double insertion, whereby, even when the magnetic disc pack may be inserted erroneously, the insertion can be blocked by the blocking plate, so that the magnetic head and like are not damaged.

9 Claims, 5 Drawing Figures

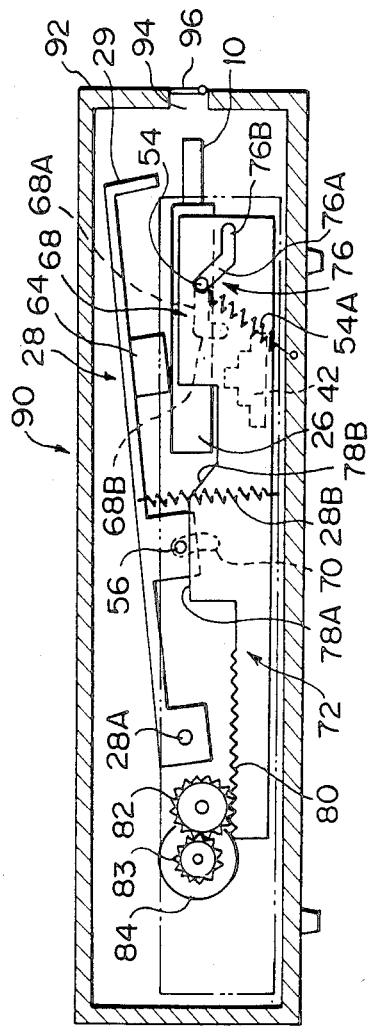
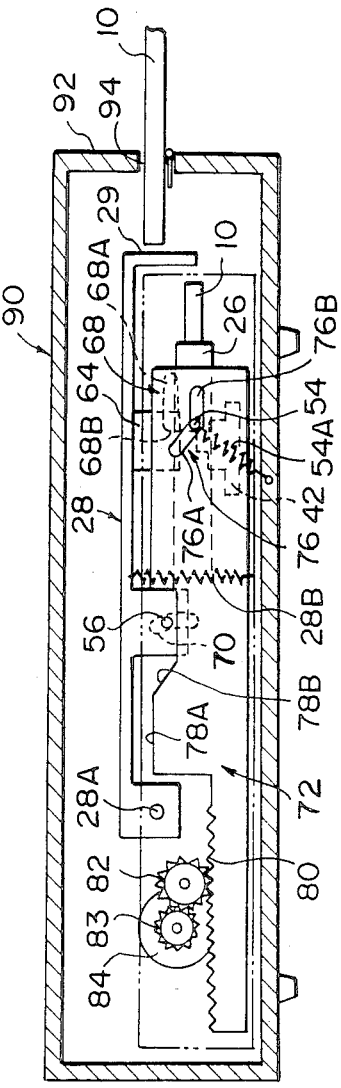
FIG. 2
FIG. 3

DEVICE FOR LOADING OR UNLOADING MAGNETIC DISC PACK

BACKGROUND OF THE INVENTION

1. Field of the Invention

This invention relates to a device for loading or unloading a magnetic disc pack, and particularly to a device for loading or unloading a magnetic disc pack used in a magnetic recorder and/or reproducer for an electronic camera and the like and incorporating therein a magnetic disc capable of magnetically recording still image information and the like.

2. Description of the Prior Art

Recently, there has been developed an electronic still camera system wherein an image pickup device such as a charge coupled device (CCD) or an image pickup tube is combined with a recording device using a magnetic disc as an inexpensive recording medium having a comparatively high memory capacity. A subject is still-photographed electronically and recorded into a rotating magnetic disc, and the reproduction of an image is carried out by a television receiver, a printer or the like, which are separately provided.

The magnetic disc utilized in the above-described system is generally in the form of a magnetic disc pack. The magnetic disc pack has rotatably mounted therein a magnetic disc capable of magnetically recording therein still image information and the like, and of being installed on a magnetic recorder assembled into an electronic camera, or on a reproducer integral with the magnetic recorder or separate therefrom.

Installing the magnetic disc pack in the magnetic recorder and/or reproducer in the electronic camera, is troublesome and inconvenient when directly coupling a center hole formed in a center core located at the central portion of the magnetic disc in the magnetic disc pack onto a rotary drive shaft of the magnetic recorder and/or reproducer, and there is a possibility that the magnetic disc pack cannot be accurately installed onto the magnetic recorder and/or reproducer.

In order to eliminate the above-described trouble there has been proposed, that such a device for loading or unloading a magnetic disc pack be constituted by a holder openly supported on a main body of the magnetic recorder and/or reproducer and a magnetic disc pack inserted into the holder, and thereafter, the holder is closed, whereby a magnetic disc of the magnetic disc pack in the holder is mounted on a rotary drive shaft of the main body of the device. A center core is provided in the central portion of the magnetic disc and the rotary drive shaft is coupled into a center hole of this center core, to thereby rotate the magnetic disc in the magnetic disc pack.

Since the above-described magnetic disc used in the electronic camera and the like is different from an ordinary floppy disc in that the magnetic disc is recorded in high density and rotated at high speed, the head touch thereof is different from the ordinary floppy disc, which is pressed against a magnetic head by a pad. More specifically in the case of the electronic camera and the like, a regulating plate having a recess is disposed at a position opposed to the magnetic head, interposing the magnetic disc therebetween, the regulating plate is positioned at a predetermined position relative to the magnetic head, whereby the magnetic disc is disposed along the magnetic head. Due to the effect of this regulating plate, the turning torque is decreased as compared with the ordinary floppy disc pressed by the pad.

Now, with the above-described rotary magnetic disc device, there is a possibility that when one magnetic disc pack has been inserted, another magnetic disc pack is erroneously doubly inserted. The double insertion of the magnetic disc packs as described above may damage the magnetic discs, magnetic head and the like.

SUMMARY OF THE INVENTION

The present invention has been developed to obviate the above-described disadvantages of the prior art and has as its object the provision of a device for loading or unloading a magnetic disc pack, wherein magnetic disc packs are prevented from being doubly inserted into a magnetic recorder and/or reproducer.

To this end, the present invention contemplates that, in a magnetic recorder and/or reproducer, wherein magnetic recording is effected onto a magnetic disc rotatably mounted in the magnetic disc pack or reproduction is effected therefrom the magnetic recorder and/or reproducer comprises:

a holder receiving therein the magnetic disc pack, for guiding a center core of the magnetic disc to a position where the center core is coupled to a rotary drive shaft;

a regulating plate holder provided with a regulating plate, for guiding the regulating plate to a position opposed to a magnetic head in the magnetic disc during magnetic recording or reproducing;

a case of the magnetic recorder and/or reproducer, incorporating therein the holder and the regulating plate holder and formed with an insertion opening for receiving the magnetic disc pack into the holder; and a blocking plate formed on the regulating plate holder, for blocking the insertion opening of the case during the magnetic recording or reproducing.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout; the figures thereof and wherein:

FIG. 2 is a side view showing the position, through which the magnetic disc pack in this embodiment is inserted and taken out;

FIG. 3 is a side view showing the recording or reproducing conditions in this embodiment;

DETAILED DESCRIPTION OF THE INVENTION

Detailed description will hereunder be given of the preferred embodiment of a device for loading or unloading a magnetic disc pack according to the present invention with reference to the accompanying drawings.

Figure 4:
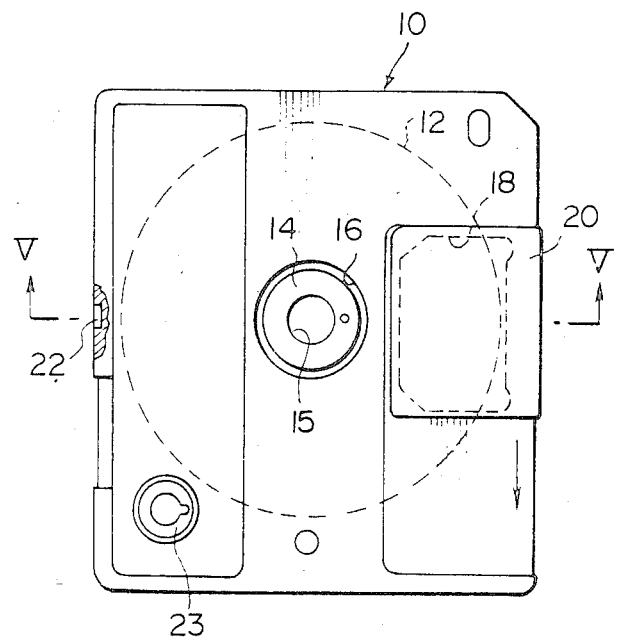
FIG. 4 is a plan view showing the magnetic disc pack used in this embodiment.
Figure 5:
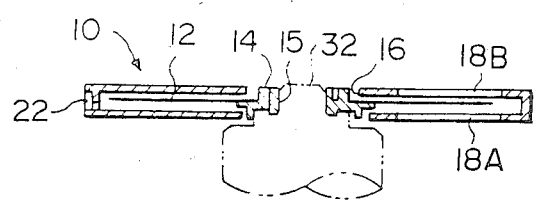
FIG. 5 is a sectional view taken along the line V—V in FIG. 4, showing the magnetic disc pack.

FIG. 4 is a plan view showing a magnetic disc pack used in a magnetic recorder and/or reproducer in an electronic camera or the like, and FIG. 5 is a sectional view taken along the line V—V in FIG. 4. As shown in FIG. 4, the magnetic disc pack 10 is of a generally square plan shape and has rotatably mounted therein a magnetic disc 12 capable of recording therein still image information and the like. The magnetic disc 12 is provided in the central portion thereof with a center core 14 being a reinforcing member, which is exposed to the outside through a circular opening 16 of the magnetic disc pack 10. The center core 14 is formed with a center hole 15. This center hole 15 is formed with an elastic piece, not shown. A drive shaft 32 to be described hereunder is coupled into the center hole 15 of the center core 14 against a biasing force of this elastic piece. The magnetic disc pack 10 is formed with a window 18A, at which is located a magnetic head to be described and with a window 18B, at which is located a regulating plate. These windows 18A and 18B are opened or closed by a slidable shutter 20. More specifically, before the magnetic disc pack 10 is inserted into a holder to be described hereunder, the shutter 20 closes the windows 18A and 18B to prevent dust from adhering to the magnetic disc 12. After the magnetic disc pack 10 is inserted into the holder to be described hereunder, the shutter 20 is engaged with a pawl provided on the holder and moves downward in FIG. 4, whereby the windows 18A and 18B are opened, so that recording or reproducing can be effected into the magnetic disc 12. In the magnetic disc pack 10, a recess 22 for engaging is formed at a side edge opposite to the shutter 20. This recess 22 is used for provisionally locking the magnetic disc pack 10 when the magnetic disc 10 is inserted into the holder to be described hereunder.

Figure 1:
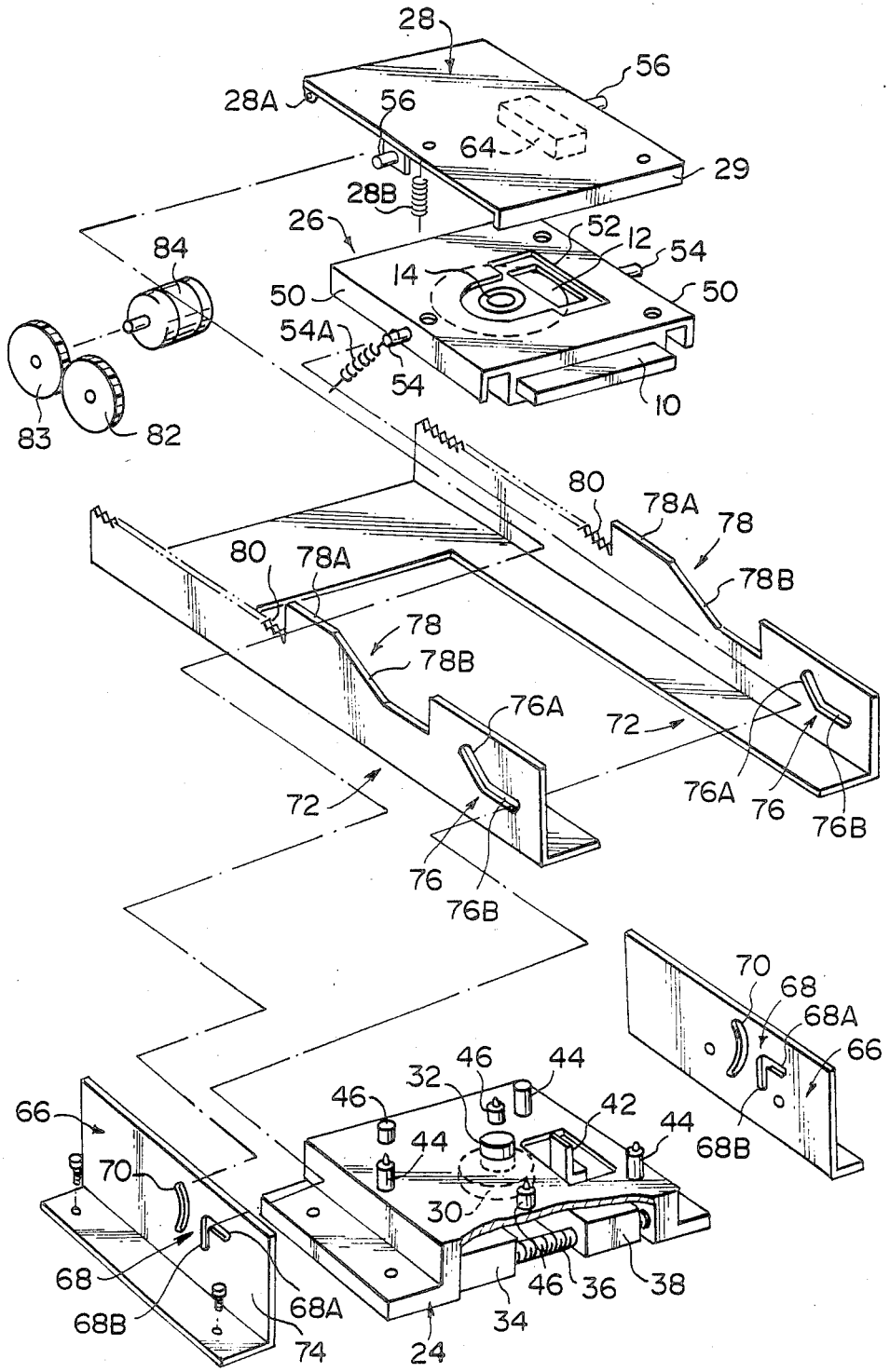
FIG. 1 is a disassembled perspective view showing the general arrangement of the magnetic recorder and/or reproducer used in this embodiment.

FIG. 1 is a general perspective view showing the magnetic recorder and/or reproducer, which is mainly constituted by a main body 24, a holder 26 and a regulating plate holder 28. Firstly, description will be given of the inner construction of the main body 24. The main body 24 is provided therein with a motor 30 for driving the magnetic disc. A drive shaft 32 of this motor 30 is coupled into the center hole 15 of the center core 14 in the magnetic disc pack 10 shown in FIG. 1 and rotates the magnetic disc 12 at a predetermined rotational speed in the magnetic disc pack 10. In FIG. 1, designated at 34 is a motor for driving the magnetic head, 36 a lead screw connected to an output shaft of this motor 34, 38 a head carriage threadably coupled to this lead screw 36 and guided by a guide shaft, not shown, to move and 42 a magnetic head provided on the head carriage 38. In consequence, when the motor 34 is rotated at a predetermined rotational speed, the head carriage 38 is moved by a predetermined pitch in the axial direction of the lead screw 36 by the rotation of the lead screw 36, whereby the magnetic head 42 moves in the radial direction of the magnetic disc 12, so that the still image information can be recorded or reproduced per track on or from the magnetic disc 12. Denoted at 44, 44 and 44 are positioning support pins for the regulating plate holder to be described hereunder, and 46, 46 and 46 positioning support pins for the magnetic disc pack 10.

As shown in FIG. 1, the holder 26 is formed into a shape capable of receiving therein the magnetic disc pack 10, and provided in the central portion thereof with an opening 52, through which are insertable the drive shaft 32, the magnetic head 42 and the like, which are provided on the side of the main body 24. Furthermore, guide pins 54 and 54 are projected from respective side surfaces of the side edges 50 and 50 of the holder 26. These guide pins 54 and 54 are guided by a pair of side plates and a slider, which are to be described hereunder, to move the holder 26 with the magnetic disc pack being loaded therein in parallel to the main body 24 and vertically relative to the main body 24, whereby the center core 14 of the magnetic disc pack 10 is guided to a position where the center core 14 is coupled onto the drive shaft 32. Each of the guide pins 54 is provided with a spring 54A.

The regulating plate holder 28 is rotatably supported by the main body 24 about a shaft 28A provided at one end thereof, urged toward the main body 24 by a spring 28B, and the other end of the regulating plate holder 28 is bent downward, to thereby form a blocking plate 29 which prevents the double insertion of the magnetic disc pack 10 as will be described hereunder. Similarly to the holder 26, the regulating plate holder 28 is projectingly provided on opposite side surfaces thereof with guide pins 56 and 56. Similarly to the guide pins 54 and 54 of the holder 26, the guide pins 56 and 56 are guided by the side plates and the slider, which are described hereunder, to move the regulating plate holder 28 in the vertical direction relative to the main body 24. The regulating plate holder 28 is provided on the rear surface thereof with a regulating plate 64, which performs a function of making the magnetic disc 12 lie along the magnetic head 42 during magnetic recording into or reproducing from the magnetic disc 12 by the magnetic head 42.

The main body 24 is secured thereto with a pair of side plates 66 and 66, each of which is formed with a guide groove 68 and a guide groove 70. The guide groove 68 is constituted by a horizontal groove 68A and a vertical groove 68B contiguous thereto, and is of a substantially L-shape as a whole. Furthermore, the guide groove 70 is of a circularly arcuate shape.

In the main body 24, the slider 72 is movably provided in a direction of inserting the magnetic disc pack 10. This slider 72 is provided with a pair of regulating grooves 76 for receiving therein the guide pins 54 of the holder 26 and a pair of cams 78 for guiding guide pins 56 and 56 of the regulating plate holder 28. Each of the regulating grooves 76 is constituted by a tapered groove 76A and a horizontal groove 76B contiguous thereto. Furthermore, each of the cams 78 is constituted by a flat portion 78A and a tapered portion 78B contiguous thereto.

On the other hand, the slider 72 is cuttingly provided with a pair of racks 80, in mesh with which are pinions 82. Gears 83 being in mesh with the pinions 82 are directly connected to a motor 84 and imparted thereto with a turning force therefrom. Additionally, the respective pairs of regulating grooves 76, cams 78 and racks 80 are formed on the both side plates 66 of the slider 72, and the slider 72 moves as will be described hereunder, whereby the holder 26 and the regulating plate holder 28 are vertically moved at predetermined timings.

The rotary magnetic disc device being of the abovedescribed arrangement is received in a case 90 of the rotary magnetic recorder and/or reproducer for use. One of side walls (on the side of the insertion opening for the holder 26) 92 of the case 90 is formed with an insertion opening 94 for the magnetic disc pack 10. A lid 96 is pivotally supported on the bottom edge of the insertion opening 94. The lid 96 is rotatably biased to be erected to a position shown in FIG. 2 by a return spring, not shown.

The following is the action of the magnetic disc pack according to the present invention with the above described arrangement. Firstly, when the magnetic disc pack 10 is inserted through the insertion opening 94 of the case 90 into the holder 26, the magnetic disc pack 10 is provisionally locked in the holder 26 as described above. At this time, the shutter 20 of the magnetic disc pack 10 is opened, and the windows 18A and 18B of the magnetic disc pack 10 are opened. In this case, each of the guide pins 54 of the holder 26 is positioned in the horizontal groove 68A of the side plate 66 and the tapered groove 76A as shown in FIG. 2, and each of the guide pins 56 of the regulating plate holder 28 is positioned in the upper portion of the guide groove 70 and at the flat portion 78A of the cam 78 of the slider 72. When the motor 84 is rotated to move the slider 72 in the direction of inserting the magnetic disc pack 10 from this state, each of the guide pins 54 of the holder 26 is regulated by the tapered groove 76A of the slider 72 to move in the horizontal groove 68A, whereby the holder 26 is moved in the horizontal direction to the left in FIG. 2. Thereafter, when each of the guide pins 54 enters the vertical groove 68B of the side plate 66 to move therein, the holder 26 descends toward the main body 24, whereby the center core 14 of the magnetic disc pack 10 is mounted on the drive shaft 32.

On the other hand, during the movement of the guide pins 54 as described above, the guide pins 56 of the regulating plate holder 28 move along the flat portions 78A of the cams 78, whereby the regulating plate holder 28 is not varied in position. When each of the guide pins 56 of the regulating plate holder 28 is positioned at the tapered portion 78B the regulating plate holder 28 is guided by the tapered portion 78B to move downward, whereby the regulating plate 64 is located at the window 18B of the magnetic disc pack 10, i.e. comes to a position opposed to the magnetic head 42. While the guide pins 56 of this regulating plate holder 28 move along the tapered portions 78B, the guide pins 54 of the holder 26 move in the horizontal grooves 76B of the slider 72, so that, in this state, the holder 26 is not varied in position. In this state, the magnetic head 42 is located at the window 18A, so that the magnetic recording into or reproducing from the magnetic disc 12 of the magnetic disc pack 10 can be effected. FIG. 3 shows the conditions of the magnetic recording or reproducing.

When the guide pins 56 of the regulating plate holder 28 descend along the tapered portions 78B as described above, the regulating plate holder 28 is gradually closed, whereby the blocking plate 29 descends, so that, during the magnetic recording or reproducing, the blocking plate 29 comes to be opposed to the insertion opening 94 of the case 90 as shown in FIG. 3. In consequence, even in another magnetic disc pack 10 is erroneously inserted through the insertion opening 94 during the magnetic recording or reproducing, the magnetic disc pack abuts against the blocking plate 29 and the further insertion becomes impossible, whereby the double insertion of the magnetic disc packs can be prevented, so that the magnetic disc, the magnetic head and the like are not damaged during the magnetic recording or reproducing.

To take out the magnetic disc pack 10, the preceding steps are reversed. More specifically, when the motor 84 is rotated reversely to move the slider 72 in the reverse direction from a position shown in FIG. 3, firstly the guide pins 56 of the regulating plate holder 28 rises along the tapered portion 78B, whereby the regulating plate holder 28 is drawn out of the window 18B of the magnetic disc pack 10 and relieved upward. While the regulating plate holder 28 is relieved upward, the guide pins 54 of the holder 26 are positioned in the horizontal grooves 76B of the slider 72 and do not move, so that the holder 26 does not move and not impinge against the regulating plate holder 28. Upon completion of the upward movement of the regulating plate holder 28, the guide pins 54 of the holder 26 are positioned in the tapered grooves 76A of the slider 72, whereby the guide pins 54 are moved into the moving paths reverse to the above, i.e. from the vertical grooves 68B to the horizontal grooves 68A, so that the holder 26 also moves upward and horizontally to the right and returns to the position, through which the magnetic disc pack 10 is inserted and taken out as shown in FIG. 2.

Since the regulating plate holder 28 is relieved upward in the above position, the blocking plate 29 is removed from the position of the insertion opening 94. In consequence, the magnetic disc pack 10 can be taken out of the insertion opening 94.

As has been described hereinabove, in the device for loading or unloading the magnetic disc pack according to the present invention, the blocking plate is formed on the regulating plate holder and the insertion opening for the magnetic disc pack is blocked by the blocking plate during the magnetic recording or reproducing, so that the double insertion of the magnetic disc packs can be avoided.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A device for loading or unloading a magnetic disc pack housing a magnetic disk into and out of a recorder/reproducer, said device comprising:

a holder adapted to receive said magnetic disc pack, said holder being further adapted for translation so as to guide a center core of said magnetic disc to a position where said center core is coupled to a rotary drive shaft;

a regulating plate;

a regulating plate holder for guiding said regulating plate to a position opposed to a magnetic recording/reproducing head;

a recorder/reproducer case, said case encasing said holder and said regulating plate holder and including an insertion opening through which said magnetic disc pack may be inserted into said holder; and a blocking plate formed on said regulating plate holder, said blocking plate closing said insertion opening during recording/reproducing.

2. The device of claim 1, wherein said blocking plate is formed by bending an end of said regulating plate.

3. The device of claim 2, wherein a slider is slidably mounted in said case, said slider having a first cam and a second cam formed thereon, said first cam guiding movement of said holder and said second cam guiding movement of said regulating plate holder.

4. The device of claim 3, wherein at least one side plate is provided in said case, each said side plate including a first regulating groove and a second regulating groove, said first regulating groove regulating movement of said holder and said second regulating groove regulating movement of said regulating plate holder.

5. The device of claim 4, wherein said second regulating groove has a circularly arcuate shape.

6. The device of claim 4, wherein said blocking plate pivots upon movement of said slider in an insertion direction.

7. The device of claim 6, wherein upon insertion of said magnetic disc into said holder and movement of said slider in said insertion direction, said magnetic disc pack is drawn toward said rotary drive shaft and said blocking plate pivots to close said insertion opening.

8. The device of claim 3, wherein a rack and pinion mechanism is provided for moving said slider in an insertion direction.

9. The device of claim 3, wherein said first cam is a groove cam and said second cam is a peripheral cam.

* * * * *